3,023,110
DEHYDRATION OF WATER CHESTNUTS
Arthur Feller Stagmeier, New York, N.Y., assignor to General Foods Corporation, White Plains, N.Y., a corporation of Delaware
No Drawing. Filed Mar. 8, 1961, Ser. No. 94,174
3 Claims. (Cl. 99—204)

This invention relates to the dehydration of water chestnuts.

At present when it is desired to dry water chestnuts, a texture difficulty is encountered with the outermost portion or skin covering the meat of the chestnut. This skin has a tendency to harden, thus forming a horny shell-like structure extending over the surface of the meat of the nut. As a consequence, where it is desired to dehydrate water chestnuts, the formation of this horny layer impedes the rehydration of the product at a later date.

It has now been found, however, that the formation of this horny structure may be averted by the processing technique herein disclosed. The present invention is based upon the finding that when raw chestnuts are dehydrated under controlled drying conditions such that the moisture content of the interior nut meat is maintained substantially uniform throughout the course of water removal, the horny interfering condition of the skin layer does not appear and a readily rehydrated dried water chestnut is obtained.

It is therefore an objective of the present invention to provide a process whereby water chestnuts can be dried to a stable, readily rehydratable form.

Another objective of the present invention is to provide a process whereby water chestnuts can be readily rehydrated in room temperature water into a condition wherein the product has an eating texture and appearance not unlike that of the raw chestnut.

As distinguished from drying techniques of the prior art, which produces case-hardened, horny outer shell layers on the nut meat product, the method of the present invention provides a dehydrated chestnut which is substantially free of such a hardened exterior. This controlled dehydration of the raw nut or pieces thereof is preferably carried out at normal atmospheric humidity conditions and at temperatures ranging from 105 to 125° F. The preferred relative humidity maintained in the treating vessel is 70 to 80, although relative humidities as low as 50 will present a satisfactory product. It is possible to employ more humid atmosphere in the course of the dehydration, but such must be accompanied by higher temperatures to insure the presence of the proper amount of moisture. Under any circumstances, however, the highest temperature permissible for drying in such a manner as herein disclosed is 180° F. at which temperature it is still possible to avoid case hardening and browning of the product provided the humidity of the drying operation is controlled.

By virtue of the controlled drying technique of the present invention, moisture evaporated from the surface of the nut piece does not occasion a significant differential in moisture throughout the nut piece such that it may be said that drying occurs at a rate below that at which moisture is evaporated from the exterior of the product. Hence, it may be said that a tempering of the product occurs in the course of drying. The role of high humidity where there are temperatures elevated above 125° F. is to control this evaporation from the surface of the nut piece. In any event, the differential between the absolute humidity of the air and that of the product is such to induce evaporation but not at a rate whereat the surface of the nut piece is desiccated and hardened before a stable moisture in the neighborhood of 10 to 12% and less is achieved.

In carrying out the process of the present invention, it is preferred that the whole raw water chestnut be lye peeled prior to dehydration, a suitable lye solution being employed to immerse the chestnut and effect a softening of the skin so that it can be readily abraded by any suitable means to remove ends or sprouts, the function of the lye being to soften the product and increase the efficiency of the removal of the surface defects. The other pieces are thereafter dipped in a weak solution of an acid, preferably a weak mineral acid such as hydrochloric, to arrest the action of the residual lye remaining on the surface and to affect a partial bleach of the nut meat.

The nut pieces having been thus prepared for dehydration are placed in a suitable container and dehydrated to a moisture content above 6% but below 12%. Chestnuts prepared by the above processing conditions of temperature and humidity have been found to rehydrate in room temperature water or more specifically water at 50° F. in about 20–30 seconds. Further, in their rehydrated condition, the chestnuts will have a white color closely approaching that of the original raw nut and a texture which is substantially identical to the initial material. The dehydrated nut will rehydrate in cold as well as hot water, and because of this, may be employed in combination with other dehydrated fruits, vegetables and meat products to produce a composite dehydrated food product.

The invention will be more particularly pointed out in the following specific example of one method of dehydrating the product.

*Example 1*

Five pounds of raw, unpeeled water chestnuts were placed in a 20% sodium hydrochloride solution having a temperature of 225° F. These chestnuts were immersed for three minutes and then removed. The caustic treated material had a soft, slimy exterior texture. The chestnuts were then introduced into an abrasive peeler which comprises a chamber having a rotating disc with a corrugated rubber surface thereon which, when in contact with the soft chestnuts, rubbed the softened surfaces of the same to effect a removal of the peel, rot and other imperfections of the chestnuts leaving a substantially skin-free white product. This product was then rinsed in cold water and dipped in a mild hydrochloric acid bath at 50° F. for 20 seconds. After removal from the acid bath, the chestnuts were again rinsed in water to remove residual quantities of acid from their surfaces which, it could be noted, took on the appearance of an extremely white color.

The thus treated chestnuts were diced by standard cutting equipment to produce ⅛ inch cubes. The subdivided cubes of nut meat were then dried on a tray drier at a temperature of 125° F. and a relative humidity of 70, which was maintained by forcing circulating hot humid air at a temperature of 110° through the containing vessel, the method of circulation comprising the upward flow of the moist air through the bed. Drying under these conditions was controlled to be between 105 and 125° F. for a cycle of 10 minutes drying time, which results in a moisture content of the final dehydrated product of 8 to 10%.

The product obtained was not horny or case hardened but rather was substantially porous at its surface. The pieces exhibited a slight appearance of a ring or marking which is known as a "heat ring" or line of demarcation of precooked product. This ring disappears immediately upon rehydrating in cold tap water and the rehydrated product has a pure white appearance the same as the original nut from which it was derived and exhibits approximately 60 to 70% moisture.

Although the process has been illustrated by reference to a specific example, it is of course obvious that the processing apparatus may be of any suitable structure to effect the procession of process steps and create the critical process conditions set forth herein. For example, the preferred means of controlling the humidity in the heating vessel is by the introduction of steam or water vapor to the area above the surface of the particles and within the stream of circulating hot air; it could still, nevertheless, be employed by introducing the additional regulating moisture in the external return line of the air recycling system so as to effect a balance of moisture and heat within the critical ranges disclosed. It is therefore applicant's expressed intent that the example set forth merely illustrates one method wherein the discovery of the present invention might be embodied.

What is claimed is:

1. A process for the dehydration of water chestnuts comprising treating the whole chestnuts with a caustic solution to soften the skin thereon, abrading said chestnuts to peel the skin therefrom, acid dipping said peeled chestnuts, placing said peeled chestnuts in a treating vessel, circulating a gaseous medium through said vessel to maintain the atmosphere in the treating vessel at a temperature of from 105° F. to 125° F. and at a relative humidity of from 70 to 80 for a period of time sufficient to reduce the moisture content level of the water chestnuts to 6–12%.

2. A process for the dehydration of water chestnuts comprising treating the whole chestnuts with a caustic solution to soften the skin thereon, abrading said chestnuts to peel the skin therefrom, acid dipping said peeled chestnuts, subdividing said chestnuts, arranging said subdivided chestnuts in a bed within a treating vessel, and circulating hot humid air through said vessel to maintain the atmosphere surrounding said bed at a temperature of from 105° F. to 125° F. and at a relative humidity of from 70 to 80 for a period of time sufficient to reduce the moisture content level of the water chestnuts to 6–12%, the rate of evaporation of the moisture from the chestnuts being controlled by the temperature and humidity of the drying air so as to avoid any substantial hardening of the outer surface of the water chestnuts.

3. A process for the dehydration of water chestnuts comprising treating the whole chestnuts with a sodium hydrochloride solution at an elevated temperature, abrading said chestnuts to peel the skin therefrom, dipping said peeled chestnuts in a mild hydrochloric acid bath, subdividing said chestnuts, arranging said subdivided chestnuts in a bed on a tray within a treating vessel, and circulating hot humid air within said vessel upwardly through said bed to maintain the atmosphere surrounding said bed at a temperature from 105° F. to 125° F. and at a relative humidity of from 70 to 80 for a treating time of about 10 minutes to thereby reduce the moisture content level of the water chestnuts to 6–12%.

No references cited.

UNITED STATES PATENT OFFICE
CERTIFICATE OF CORRECTION

Patent No. 3,023,110                         February 27, 1962

Arthur Feller Stagmeier

It is hereby certified that error appears in the above numbered patent requiring correction and that the said Letters Patent should read as corrected below.

Column 2, line 34, and column 4, line 16, for "hydrochloride", each occurrence, read -- hydroxide --.

Signed and sealed this 17th day of November 1964.

(SEAL)
Attest:

ERNEST W. SWIDER
Attesting Officer

EDWARD J. BRENNER
Commissioner of Patents